(12) United States Patent
Goulding et al.

(10) Patent No.: US 7,544,400 B2
(45) Date of Patent: Jun. 9, 2009

(54) BIMESOGENIC COMPOUNDS AND FLEXOELECTRIC DEVICES

(75) Inventors: Mark John Goulding, Ringwood (GB); Kevin Aldem, Bournemouth (GB); Warren Duffy, Southhampton (GB); Patricia Eileen Saxton, Romsey (GB)

(73) Assignee: Merck Patent GmbH, Darmstadt (DE)

( * ) Notice: Subject to any disclaimer, the term of this patent is extended or adjusted under 35 U.S.C. 154(b) by 0 days.

(21) Appl. No.: 11/722,594

(22) PCT Filed: Nov. 28, 2005

(86) PCT No.: PCT/EP2005/012685

§ 371 (c)(1),
(2), (4) Date: Jun. 22, 2007

(87) PCT Pub. No.: WO2006/066688

PCT Pub. Date: Jun. 29, 2006

(65) Prior Publication Data

US 2008/0142758 A1 Jun. 19, 2008

(30) Foreign Application Priority Data

Dec. 23, 2004 (EP) .................. 04030604

(51) Int. Cl.
*C09K 19/12* (2006.01)
*C09K 19/20* (2006.01)
*C09K 19/30* (2006.01)
*C07C 25/13* (2006.01)
*C07C 43/225* (2006.01)

(52) U.S. Cl. ............. 428/1.1; 252/299.63; 252/299.66; 252/299.67; 570/127; 570/129; 570/131; 568/639

(58) Field of Classification Search ............ 252/299.01, 252/299.61, 299.63, 299.66; 570/127, 129, 570/130, 131; 428/1.1; 568/639
See application file for complete search history.

(56) References Cited

FOREIGN PATENT DOCUMENTS

| | | | |
|---|---|---|---|
| EP | 1 477 547 A | | 11/2004 |
| GB | 2 356 629 A | | 5/2001 |
| JP | 58-035174 | * | 3/1983 |
| JP | 10 237004 A | | 9/1998 |

OTHER PUBLICATIONS

CAPLUS 1983: 438380.*

* cited by examiner

*Primary Examiner*—Shean C Wu
(74) *Attorney, Agent, or Firm*—Millen, White, Zelano & Branigan, P.C.

(57) ABSTRACT

The invention relates to bimesogenic compounds of formula (I): $R^1\text{-}MG^1\text{-}X^1\text{-}Sp\text{-}X^2\text{-}MG^2\text{-}R^2$ wherein $R^1, R^2, MG^1, MG^2, X^1, X^2$ and Sp have the meaning given in claim 1, to the use of bimesogenic compounds of formula (I) in liquid crystal media and devices, in particular in flexoelectric liquid crystal devices, to liquid crystal media and devices, in particular flexoelectric devices, comprising bimesogenic compounds of formula (I) and to improvements in flexoelectric devices.

20 Claims, No Drawings

BIMESOGENIC COMPOUNDS AND FLEXOELECTRIC DEVICES

The invention relates to bimesogenic compounds, their preparation and their use in liquid crystal media and devices, in particular in flexoelectric liquid crystal devices. The invention further relates to liquid crystal media and devices, in particular flexoelectric devices, comprising bimesogenic compounds and to improvements in flexoelectric devices.

Flexoelectric liquid crystal materials are known in prior art. The flexoelectric effect is described inter alia by Chandrasekhar, "Liquid Crystals", $2^{nd}$ edition, Cambridge University Press (1992) and P. G. deGennes et al., "The Physics of Liquid Crystals", $2^{nd}$ edition, Oxford Science Publications (1995).

Flexoelectric distortion can occur in a material comprising molecules with an asymmetric shape and a strong electric dipole moment upon application of an electric field. When no field is applied, the material is undistorted and exhibits no bulk polarization In the presence of an electric field, however, the permanent dipoles are forced to align along the field and the material will become distorted due to the asymmetric shape of the molecules. This leads to a macroscopic polarization in the material in the direction of the applied field.

In 1987 it was postulated by R. B. Meyer and J. S. Patel in Phys. Rev. Lett. 58 (15), 1538 (1987) that chiral nematic materials with a flexoelectric effect should exhibit fast electro-optic switching, which would make them interesting materials for liquid crystal displays and optical switches. Further work in this field is described e.g. by P. Rudquist et al., Liq. Cryst. 23 (4), 503 (1997).

In a flexoelectric chiral nematic liquid crystal material with a helically twisted molecular orientation, application of an electric field perpendicular to the helix axis causes distortion to the molecular directors, whereas the direction of the helical axis remains unchanged. This leads to a change in the optical properties of the material, i.e. a tilt of the optical axis, relative to the helical axis, in the plane perpendicular to the direction of the applied field. The switching angle φ is defined as twice the tilt angle θ.

The tilt of the optic axis causes a change in transmission of a sample of the flexoelectric material placed between crossed polarizers, which can be exploited in electrooptical applications.

However, the flexoelectric display devices and liquid crystal materials used therein that are known from prior art have several drawbacks. Thus, as it is often difficult to achieve uniform alignment over the entire active area of the display cell, previously only small areas could be aligned which required shearing of the cell.

Furthermore, when applying an electric field to the display, hitherto only moderate switching angles could be achieved at temperatures close to room temperature, whereas on the other hand high switching angles required high applied fields.

Bimesogenic compounds and their use in flexoelectric displays are known e.g. from GB 2 356 629.

JP 10-237 004 (A) teaches halogen containing alkylenedioxy compounds like e.g. that of formula II a It was an aim of the invention to provide improved flexoelectric devices that exhibit high switching angles and fast response times. Another aim was to provide liquid crystal materials with advantageous properties, in particular for use in flexoelectric displays, that enable good uniform alignment over the entire area of the display cell without the use of a mechanical shearing process, good contrast, high switching angles and fast response times also at low temperatures. The liquid crystal materials should exhibit low melting points, broad chiral nematic phase ranges, small and temperature independent pitch lengths and high flexoelectric coefficients. Other aims of the present invention are immediately evident to the person skilled in the art from the following detailed description.

The inventors have found out that the above aims can be achieved by providing bimesogenic compounds according to the present invention. These compounds, when used in chiral nematic liquid crystal mixtures, lead to low melting points, broad chiral nematic phases. In particular, they exhibit high values of the elastic constant $K_{11}$ and the flexoelectric coefficient.

Apart from the use in flexoelectric devices, the inventive bimesogenic compounds as well as mixtures thereof are also suitable for other types of displays and other optical and electrooptical applications, such as optical compensation or polarizing films, colour filters, reflective cholesterics, optical rotatory power and optical information storage.

The inventors have also achieved several improvements in flexoelectric display devices that lead to improved electrooptical performance of these displays. Thus, it was found that by using a display cell comprising two transparent, plane parallel electrodes with hybrid alignment conditions, i.e. homeotropic alignment on the first electrode surface and planar alignment on the second electrode surface of the cell, improved flexoelectric switching performance of the display, in particular high switching angles, fast response times and good contrast can be achieved with stable alignment.

The term mesogenic compound as used in the foregoing and the following comprise compounds with a rod-shaped, board-shaped or disk-shaped mesogenic group, i.e. a group with the ability to induce mesophase behaviour in a compound comprising said group. These compounds do not necessarily have to exhibit mesophase behaviour themselves. Sometimes these compounds show mesophase behaviour only in mixtures with other compounds or, in case of polymerizable compounds, when these compounds or mixtures thereof are polymerized.

The term homeotropic alignment or orientation of a liquid crystal or mesogenic material in a display cell or on a substrate means that the mesogenic groups in the liquid crystal or mesogenic material are oriented substantially perpendicular to the plane of the cell or substrate, respectively.

The term planar alignment or orientation of a liquid crystal or mesogenic material in a display cell or on a substrate means that the mesogenic groups in the liquid crystal or mesogenic material are oriented substantially parallel to the plane of the cell or substrate, respectively.

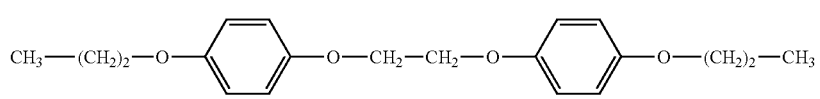

IIa

The term hybrid alignment or orientation of a liquid crystal or mesogenic material in a display cell or between two substrates means that the mesogenic groups adjacent to the first cell wall or on the first substrate exhibit homeotropic orientation, and the mesogenic groups adjacent to the second cell wall or on the second substrate exhibit planar orientation.

One object of the present invention are bimesogenic compounds of formula I

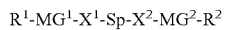

wherein $R^1$ and $R^2$ are each independently F, Cl, CN, NCS or a straight-chain or branched alkyl group with 1 to 25 C atoms which may be unsubstituted, mono- or polysubstituted by halogen or CN, it being also possible for one or more non-adjacent $CH_2$ groups to be replaced, in each case independently from one another, by —O—, —S—, —NH—, —N(CH$_3$)—, —CO—, —COO—, —OCO—, —O—CO—O—, —S—CO—, —CO—S—, —CH=CH—, —CH=CF—, —CF=CF— or —C≡C— in such a manner that oxygen atoms are not linked directly to one another, $MG^1$ and $MG^2$ are each independently a mesogenic group, Sp is a spacer group comprising 4 to 40 C atoms, wherein one or more non-adjacent $CH_2$ groups may also be replaced by —O—, —S—, —NH—, —N(CH$_3$)—, —CO—, —O—CO—, —S—CO—, —O—COO—, —CO—S—, —CO—O—, —CH(halogen)-, —CH(CN)—, —CH=CH— or —C≡C—, and $X^1$ and $X^2$ are each independently —O—, —S—, —CO—, —COO—, —OCO—, —O—CO—O—, —CO—NH—, —NH—CO—, —CH$_2$CH$_2$—, —OCH$_2$—, —CH$_2$O—, —SCH$_2$—, —CH$_2$S—, —CH=CH—, —CH=CH—COO—, —OCO—CH=CH—, —C≡C—, —CF$_2$O—, —OCF$_2$—, —CF$_2$—CF$_2$—, —CH$_2$—CF$_2$—, —CF$_2$—CH$_2$— or a single bond, characterised in that, at least one of the mesogenic groups $MG^1$ and $MG^2$ comprises one or more linking groups seleted from —CF$_2$O— and —OCF$_2$—.

Preferred are compounds of formula I wherein least one of $X^1$ and $X^2$ is selected from —CF$_2$O—, —OCF$_2$—, —CF$_2$—CF$_2$—, —CH$_2$—CF$_2$— and —CF$_2$—CH$_2$—

Further especially preferrred are compounds of formula I which have a symmetrical, however in another preferred embodiment the compounds of formula I are non-symmetrical.

Another object of the invention is the use of bimesogenic compounds of formula I in liquid crystalline media and liquid crystal displays.

Another object of the invention is a liquid crystalline medium comprising at least two components, at least one of which is a bimesogenic compound of formula I.

Another object of the invention is a liquid crystal display with a liquid crystalline medium comprising at least two components, at least one of which is a bimesogenic compound of formula I.

Another object of the invention is a flexoelectric liquid crystal display with a liquid crystalline medium comprising at least two components, at least one of which is a bimesogenic compound of formula I.

At least one of the and preferably both mesogenic groups $MG^1$ and $MG^2$ are preferably selected of formula II

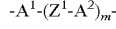

wherein at least one $Z^1$ is —CF$_2$O— or —OCF$_2$— and the other $Z^1$ are, in each case independently, —COO—, —OCO—, —O—CO—O—, —OCH$_2$—, —CH$_2$O—, —OCF$_2$—, —CF$_2$O—, —CH$_2$CH$_2$—, —(CH$_2$)$_4$—, —CF$_2$CF$_2$—, —CH$_2$CF$_2$—, —CF$_2$CH$_2$—, —CH=CH—, —CF=CF—, —CH=CH—COO—, —OCO—CH=CH—, —C≡C— or a single bond, $A^1$ and $A^2$ are each independently 1,4-phenylene, wherein in addition one or more CH groups may be replaced by N, trans-1,4-cyclohexylene in which, in addition, one or two non-adjacent $CH_2$ groups may be replaced by O and/or S, 1,4-cyclohexenylene, 1,4-bicyclo-(2,2,2)-octylene, piperidine-1,4-diyl, naphthalene-2,6-diyl, decahydro-naphthalene-2,6-diyl, 1,2,3,4-tetrahydro-naphthalene-2,6-diyl, cyclobutane-1,3-diyl, spiro[3.3]heptane-2,6-diyl or dispiro[3.1.3.1] decane-2,8-diyl, it being possible for all these groups to be unsubstituted, mono-, di-, tri- or tetra-substituted with F, Cl, CN or alkyl, alkoxy, alkylcarbonyl or alkoxycarbonyl groups with 1 to 7 C atoms, wherein one or more H atoms may be substituted by F or Cl, m is 0, 1, 2 or 3.

Especially preferred are compounds of formula I wherein $R^1$-$MG^1$-$X^1$- and $R^2$-$MG^2$-$X^2$- are identical.

Another preferred embodiment of the present invention relates to compounds of formula I wherein $R^1$-$MG^1$-$X^1$- and $R^2$-$MG^2$-$X^2$- are different.

Especially preferred are compounds of formula I wherein the mesogenic groups $MG^1$ and $MG^2$ comprise one, two or three six-membered rings.

A smaller group of preferred mesogenic groups of formula II is listed below. For reasons of simplicity, Phe in these groups is 1,4-phenylene, PheL is a 1,4-phenylene group which is substituted by 1 to 4 groups L, with L being F, Cl, CN, OH, NO$_2$ or an optionally fluorinated alkyl, alkoxy or alkanoyl group with 1 to 7 C atoms, and Cyc is 1,4-cyclohexylene. This list is comprising the sub-formulae shown below as well as their mirror images

| | |
|---|---|
| -Phe-Z-Phe- | II-1 |
| -Phe-Z-Cyc- | II-2 |
| -Cyc-Z-Cyc- | II-3 |
| -PheL-Z-Phe- | II-4 |
| -PheL-Z-Cyc- | II-5 |
| -PheL-Z-PheL- | II-6 |
| -Phe-Z-Phe-Z-Phe- | II-7 |
| -Phe-Z-Phe-Z-Cyc- | II-8 |
| -Phe-Z-Cyc-Z-Phe- | II-9 |
| -Cyc-Z-Phe-Z-Cyc- | II-10 |
| -Phe-Z-Cyc-Z-Cyc- | II-11 |
| -Cyc-Z-Cyc-Z-Cyc- | II-12 |
| -Phe-Z-Phe-Z-PheL- | II-13 |
| -Phe-Z-PheL-Z-Phe- | II-14 |
| -PheL-Z-Phe-Z-Phe- | II-15 |
| -PheL-Z-Phe-Z-PheL- | II-16 |
| -PheL-Z-PheL-Z-Phe- | II-17 |
| -PheL-Z-PheL-Z-PheL- | II-18 |
| -Phe-Z-PheL-Z-Cyc- | II-19 |
| -Phe-Z-Cyc-Z-PheL- | II-20 |
| -Cyc-Z-Phe-Z-PheL- | II-21 |
| -PheL-Z-Cyc-Z-PheL- | II-22 |
| -PheL-Z-PheL-Z-Cyc- | II-23 |
| -PheL-Z-Cyc-Z-Cyc- | II-24 |
| -Cyc-Z-PheL-Z-Cyc- | II-25 | wherein at least one of the groups Z present is —CF$_2$O— or —OCF$_2$—.

Particularly preferred are the sub-formulae II-1, II-2, II-4, II-6, II-7, II-8, II-11, II-13, II-14, II-15 and II-16.

In these preferred groups Z in each case independently has one of the meanings of $Z^1$ as given in formula I. Preferably Z is —COO—, —OCO—, —CH$_2$CH$_2$—, —C≡C— or a single bond.

Very preferably the mesogenic groups MG$^1$ and MG$^2$ are selected from the following formulae II a to II j and their respective mirror images

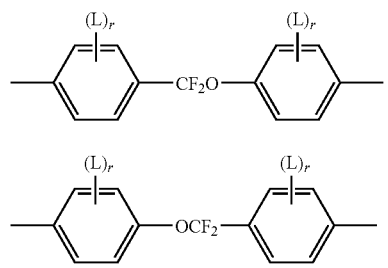

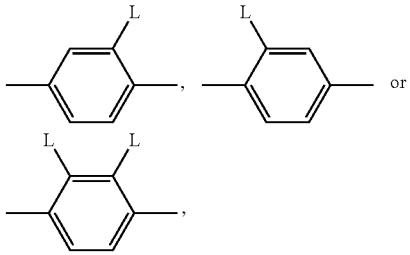

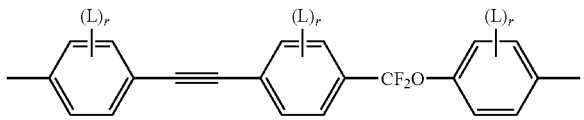

wherein L has the meaning given above and r in each occurrence independently is 0, 1 or 2.

The group

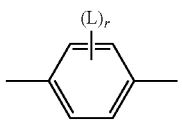

in these preferred formulae is very preferably denoting

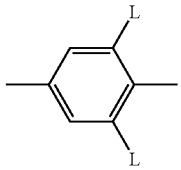

furthermore with L having each independently one of the meanings given above.

Particularly preferred are the sub-formulae II a, II d, II g, II h, II i and II o, in particular the sub-formulae II a and II d.

L is preferably F, Cl, CN, OH, NO$_2$, CH$_3$, C$_2$H$_5$, OCH$_3$, OC$_2$H$_5$, COCH$_3$, COC$_2$H$_5$, COOCH$_3$, COOC$_2$H$_5$, CF$_3$, OCF$_3$, OCHF$_2$, OC$_2$F$_5$, in particular F, Cl, CN, CH$_3$, C$_2$H$_5$, OCH$_3$, COCH$_3$ and OCF$_3$, most preferably F, Cl, CH$_3$, OCH$_3$ and COCH$_3$.

In case of a compounds with a non-polar group, $R^1$ and $R^2$ are preferably alkyl with up to 15 C atoms or alkoxy with 2 to 15 C atoms.

If $R^1$ or $R^2$ is an alkyl or alkoxy radical, i.e. where the terminal CH$_2$ group is replaced by —O—, this may be straight-chain or branched. It is preferably straight-chain, has 2, 3, 4, 5, 6, 7 or 8 carbon atoms and accordingly is preferably ethyl, propyl, butyl, pentyl, hexyl, heptyl, octyl, ethoxy, propoxy, butoxy, pentoxy, hexoxy, heptoxy, or octoxy, furthermore methyl, nonyl, decyl, undecyl, dodecyl, tridecyl, tetradecyl, pentadecyl, nonoxy, decoxy, undecoxy, dodecoxy, tridecoxy or tetradecoxy, for example.

Oxaalkyl, i.e. where one $CH_2$ group is replaced by —O—, is preferably straight-chain 2-oxapropyl (=methoxymethyl), 2-(=ethoxymethyl) or 3-oxabutyl (=2-methoxyethyl), 2-, 3-, or 4-oxapentyl, 2-, 3-, 4-, or 5-oxahexyl, 2-, 3-, 4-, 5-, or 6-oxaheptyl, 2-, 3-, 4-, 5-, 6- or 7-oxaoctyl, 2-, 3-, 4-, 5-, 6-, 7- or 8-oxanonyl or 2-, 3-, 4-, 5-, 6-,7-, 8- or 9-oxadecyl, for example.

In case of a compounds with a terminal polar group, $R^1$ and $R^2$ are selected from CN, $NO_2$, halogen, $OCH_3$, OCN, SCN, $COR^3$, $COOR^3$ or a mono- oligo- or polyfluorinated alkyl or alkoxy group with 1 to 4 C atoms. $R^3$ is optionally fluorinated alkyl with 1 to 4, preferably 1 to 3 C atoms. Halogen is preferably F or Cl.

Especially preferably $R^1$ and $R^2$ in formula I are selected of F, Cl, CN, $NO_2$, $OCH_3$, $COCH_3$, $COC_2H_5$, $COOCH_3$, $COOC_2H_5$, $CF_3$, $C_2F_5$, $OCF_3$, $OCHF_2$, and $OC_2F_5$, in particular of F, Cl, CN, $OCH_3$ and $OCF_3$.

In the compounds of formula I $R^1$ and $R^2$ may be a chiral or achiral group. In case of a chiral group they are preferably selected according to formula III

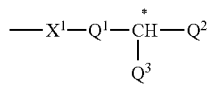

III wherein
$X^1$ is —O—, —S—, —CO—, —COO—, —OCO—, —OCOO— or a single bond,
$Q^1$ is an alkylene or alkylene-oxy group with 1 to 10 C atoms or a single bond,
$Q^2$ is an alkyl or alkoxy group with 1 to 10 C atoms which may be unsubstituted, mono- or polysubstituted by halogen or CN, it being also possible for one or more non-adjacent $CH_2$ groups to be replaced, in each case independently from one another, by —C≡C—, —O—, —S—, —NH—, —N($CH_3$)—, —CO—, —COO—, —OCO—, —OCO—O—, —S—CO— or —CO—S— in such a manner that oxygen atoms are not linked directly to one another,
$Q^3$ is halogen, a cyano group or an alkyl or alkoxy group with 1 to 4 C atoms different from $Q^2$.

In case $Q^1$ in formula III is an alkylene-oxy group, the O atom is preferably adjacent to the chiral C atom.

Preferred chiral groups $R^1$ and $R^2$ are 2-butyl (=1-methylpropyl), 2-methylbutyl, 2-methylpentyl, 3-methylpentyl, 2-ethylhexyl, 2-propylpentyl, 2-octyl, in particular 2-methylbutyl, 2-methylbutoxy, 2-methylpentoxy, 3-methylpentoxy, 2-ethylhexoxy, 1-methylhexoxy, 2-octyloxy, 2-oxa-3-methylbutyl, 3-oxa-4-methylpentyl, 4-methylhexyl, 2-nonyl, 2-decyl, 2-dodecyl, 6-methoxyoctoxy, 6-methyloctoxy, 6-methyloctanoyloxy, 5-methylheptyloxycarbonyl, 2-methylbutyryloxy, 3-methylvaleroyloxy, 4-methylhexanoyloxy, 2-chlorpropionyloxy, 2-chloro-3-methylbutyryloxy, 2-chloro-4-methylvaleryloxy, 2-chloro-3-methylvaleryloxy, 2-methyl-3-oxapentyl, 2-methyl-3-oxahexyl, 1-methoxypropyl-2-oxy, 1-ethoxypropyl-2-oxy, 1-propoxypropyl-2-oxy, 1-butoxypropyl-2-oxy, 2-fluorooctyloxy, 2-fluorodecyloxy for example.

In addition, compounds of formula I containing an achiral branched group $R^1$ and/or $R^2$ may occasionally be of importance, for example, due to a reduction in the tendency towards crystallization. Branched groups of this type generally do not contain more than one chain branch. Preferred achiral branched groups are isopropyl, isobutyl (=methylpropyl), isopentyl (=3-methylbutyl), isopropoxy, 2-methyl-propoxy and 3-methylbutoxy.

As for the spacer group Sp in formula I all groups can be used that are known for this purpose to the skilled in the art. The spacer group Sp is preferably a linear or branched alkylene group having 5 to 40 C atoms, in particular 5 to 25 C atoms, very preferably 5 to 15 C atoms, in which, in addition, one or more non-adjacent $CH_2$ groups may be replaced by —O—, —S—, —NH—, —N($CH_3$)—, —CO—, —O—CO—, —S—CO—, —O—COO—, —CO—S—, —CO—O—, —CH(halogen)-, —CH(CN)—, —CH=CH— or —C≡C—.

Typical spacer groups are for example —$(CH_2)_o$—, —$(CH_2CH_2O)_p$—$CH_2CH_2$—, —$CH_2CH_2$—S—$CH_2CH_2$— or —$CH_2CH_2$—NH—$CH_2CH_2$—, with o being an integer from 5 to 40, in particular from 5 to 25, very preferably from 5 to 15, and p being an integer from 1 to 8, in particular 1, 2, 3 or 4.

Preferred spacer groups are pentylene, hexylene, heptylene, octylene, nonylene, decylene, undecylene, dodecylene, octadecylene, diethyleneoxyethylene, dimethyleneoxybutylene, pentenylene, heptenylene, nonenylene and undecenylene, for example.

Especially preferred are inventive compounds of formula I wherein Sp is denoting alkylene with 5 to 15 C atoms. Straight-chain alkylene groups are especially preferred.

In another preferred embodiment of the invention the chiral compounds of formula I comprise at least one spacer group Sp that is a chiral group of the formula IV:

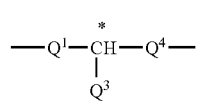

IV wherein
$Q^1$ is an alkylene or alkylene-oxy group with 1 to 16 C atoms or a single bond,
$Q^2$ is an alkyl or alkoxy group with 2 to 16 C atoms which may be unsubstituted, mono- or polysubstituted by halogen or CN, it being also possible for one or more non-adjacent $CH_2$ groups to be replaced, in each case independently from one another, by —C≡C—, —O—, —S—, —NH—, —N($CH_3$)—, —CO—, —COO—, —OCO—, —OCO—O—, —S—CO— or —CO—S— in such a manner that oxygen atoms are not linked directly to one another,
$Q^3$ is halogen, a cyano group or an alkyl or alkoxy group with 1 to 7 C atoms different from $Q^2$.

In case $Q^1$ in formula III is an alkylene-oxy group, the O atom is preferably adjacent to the chiral C atom.

$X^1$ and $X^2$ in formula I denote preferably —O—, —CO—, —COO—, —OCO—, —O—CO—O— or a single bond.

Particularly preferred are the following compounds of formulae II-1 and II-2

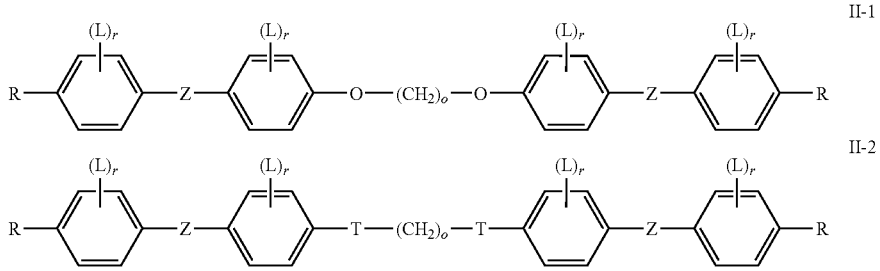

wherein R has one of the meanings of R¹, Z has one of the meanings of Z¹, T is —C≡C— and o, L and r are as defined above, including the preferred meanings of these groups.

The compounds of formula I can be synthesized according to or in analogy to methods which are known per se and which are described in standard works of organic chemistry such as, for example, Houben-Weyl, Methoden der organischen Chemie, Thieme-Verlag, Stuttgart. Some specific methods of preparation can be taken from the examples.

Another object of the present invention is a liquid crystalline medium comprising at least one compound of formula I.

In a preferred embodiment of the invention the liquid crystalline medium is consisting of 2 to 25, preferably 3 to 15 compounds, at least one of which is a compound of formula I.

The liquid crystalline mixture according to the invention preferably comprises 1 to 5, very preferably 1, 2 or 3 compounds of formula I.

The other compounds are preferably low molecular weight liquid crystalline co-components selected from nematic or nematogenic substances, for example from the known classes of the azoxybenzenes, benzylidene-anilines, biphenyls, terphenyls, phenyl or cyclohexyl benzoates, phenyl or cyclohexyl esters of cyclohehexanecarboxylic acid, phenyl or cyclohexyl esters of cyclohexylbenzoic acid, phenyl or cyclohexyl esters of cyclohexylcyclohexanecarboxylic acid, cyclohexylphenyl esters of benzoic acid, of cyclohexanecarboxylic acid and of cyclohexylcyclohexanecarboxylic acid, phenylcyclohexanes, cyclohexyl-biphenyls, phenylcyclohexylcyclohexanes, cyclohexylcyclohexanes, cyclohexylcyclohexenes, cyclohexylcyclohexylcyclohexenes, 1,4-bis-cyclohexylbenzenes, 4,4'-bis-cyclohexylbiphenyls, phenyl- or cyclo-hexylpyrimidines, phenyl- or cyclohexylpyridines, phenyl- or cyclo-hexylpyridazines, phenyl- or cyclohexyldioxanes, phenyl- or cyclo-hexyl-1,3-dithianes, 1,2-diphenyl-ethanes, 1,2-dicyclohexylethanes, 1-phenyl-2-cyclohexylethanes, 1-cyclohexyl-2-(4-phenylcyclohexyl)-ethanes, 1-cyclohexyl-2-biphenyl-ethanes, 1-phenyl2-cyclohexyl-phenylethanes, optionally halogenated stilbenes, benzyl phenyl ether, tolanes, substituted cinnamic acids and further classes of nematic or nematogenic substances. The 1,4-phenylene groups in these compounds may also be laterally mono- or difluorinated.

The liquid crystalline mixture of this preferred embodiment is based on the achiral compounds of this type.

The most important compounds that are possible as components of these liquid crystalline mixtures can be characterized by the following formula

R'-L'-G'-E-R"

wherein L' and E, which may be identical or different, are in each case, independently from one another, a bivalent radical from the group formed by -Phe-, -Cyc-, -Phe-Phe-, -Phe-Cyc-, -Cyc-Cyc-, -Pyr-, -Dio-, —B-Phe- and —B-Cyc- and their mirror images, where Phe is unsubstituted or fluorine-substituted 1,4-phenylene, Cyc is trans-1,4-cyclohexylene or 1,4-cyclohexenylene, Pyr is pyrimidine-2,5-diyl or pyridine-2,5-diyl, Dio is 1,3-dioxane-2,5-diyl abd B is 2-(trans-1,4-cyclohexyl)ethyl, pyrimidine-2,5-diyl, pyridine-2,5-diyl or 1,3-dioxane-2,5-diyl.

G' in these compounds is selected from the following bivalent groups —CH═CH—, —N(O)N—, —CH═CY—, —CH═N(O)—, —C≡C—, —CH₂—CH₂—, —CO—O—, —CH₂—O—, —CO—S—, —CH₂—S—, —CH═N—, —COO-Phe-COO— or a 20 single bond, with Y being halogen, preferably chlorine, or —CN.

R' and R" are, in each case, independently of one another, alkyl, alkenyl, alkoxy, alkenyloxy, alkanoyloxy, alkoxycarbonyl or alkoxycarbonyloxy with 1 to 18, preferably 3 to 12 C atoms, or alternatively one of R' and R" is F, CF₃, OCF₃, Cl, NCS or CN.

In most of these compounds R' and R" are, in each case, independently of each another, alkyl, alkenyl or alkoxy with different chain length, wherein the sum of C atoms in nematic media generally is between 2 and 9, preferably between 2 and 7.

Many of these compounds or mixtures thereof are commercially available. All of these compounds are either known or can be prepared by methods which are known per se, as described in the literature (for example in the standard works such as Houben-Weyl, Methoden der Organischen Chemie [Methods of Organic Chemistry], Georg-Thieme-Verlag, Stuttgart), to be precise under reaction conditions which are known and suitable for said reactions. Use may also be made here of variants which are known per se, but are not mentioned here.

The liquid crystalline medium according to this preferred embodiment comprises preferably 5 to 90%, in particular 10 to 75%, very preferably 15 to 60% by weight of one or more compounds of formula I.

In another preferred embodiment of the present invention, the liquid crystal medium essentially consists of bimesogenic compounds of formula I.

To induce a helical twist in the liquid crystalline medium that is needed in case of flexoelectric displays, preferably one or more chiral dopants are added to the medium.

In addition or alternatively to the chiral dopants it is also possible to use one or more bimesogenic compounds with a chiral group, or one or more co-components as described above with a chiral group.

A liquid crystalline medium according to the preferred embodiments as described above comprises one or more chiral dopants which themselves do not necessarily have to show a liquid crystalline phase and give good uniform alignment themselves.

Especially preferred are chiral dopants with a high helical twisting power (HTP), in particular those disclosed in WO 98/00428. Further typically used chiral dopants are e.g. the commercially available R-811, S-811, R-1011, S-1011, R-811 or CB 15 (all from Merck KGaA, Darmstadt, Germany).

Especially preferred are chiral dopants selected from formula VII

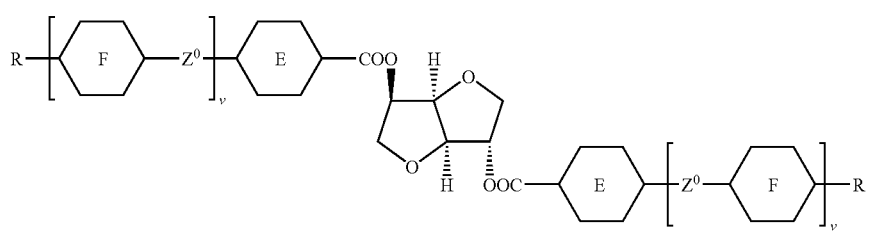

VII and/or of formula VIII

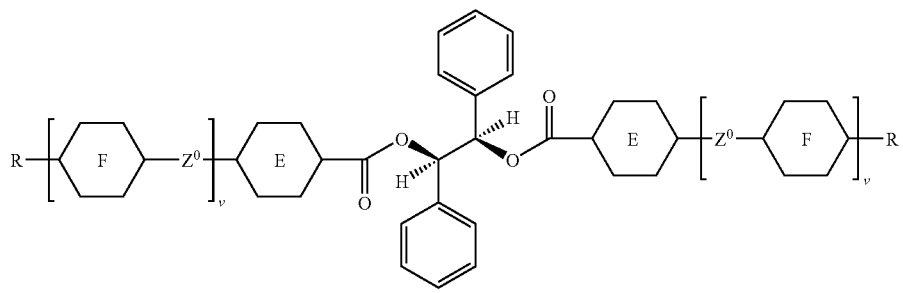

VIII including the respective (S,S) enantiomer, wherein E and F are each independently 1,4-phenylene or trans-1,4-cyclohexylene, v is 0 or 1, $Z^0$ is —COO—, —OCO—, —CH$_2$CH$_2$— or a single bond, and R is alkyl, alkoxy or alkanoyl with 1 to 12 C atoms.

The compounds of formula VII and their synthesis are described in WO 98/00428. The compounds of formula VIII and their synthesis are described in GB 2,328,207.

The above chiral compounds of formula VII and VIII exhibit a very high helical twisting power (HTP), and are therefore particularly useful for the purpose of the present invention.

The liquid crystalline medium preferably comprises preferably 1 to 5, in particular 1 to 3, very preferably 1 or 2 chiral dopants.

The amount of chiral dopants in the liquid crystalline medium is preferably from 0.1 to 15%, in particular from 0.3 to 10%, very preferably 0.5 to 8% by weight of the total mixture.

A medium comprising more than one, in particular 2, 3 or 4 dopants, preferably selected from the above formulae VII and VIII, is particularly preferred, as thereby crystallization of the dopant is suppressed.

Further preferred are liquid crystalline media comprising one or more additives selected from low viscosity additives, additives with a high positive Δε and high clearing point additives.

Suitable high Δε additives are e.g. mesogenic or liquid crystalline compounds selected from the following formulae

IX

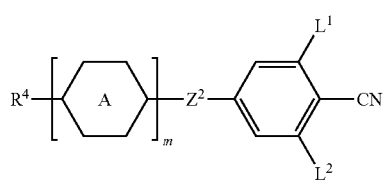

-continued

X

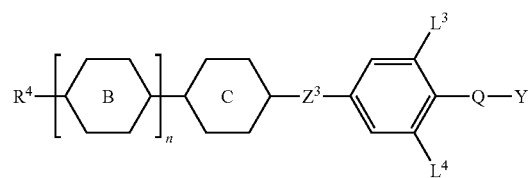

wherein $R^4$ is alkyl, alkoxy, alkenyl or alkenyloxy with up to 12 C atoms,

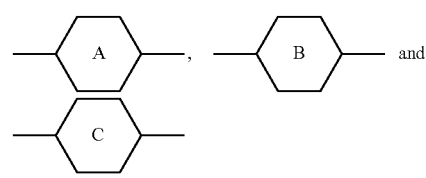

are each independently

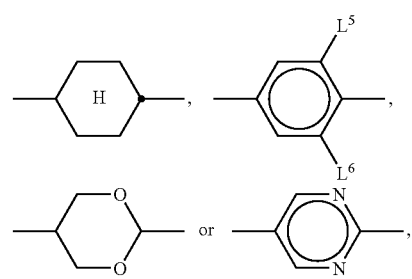

$L^1$ through $L^6$ are each independently H or F, $Z^2$ is —COO—, —CH$_2$CH$_2$— or a single bond, $Z^3$ is —COO—, —CH$_2$CH$_2$—, —C≡C— or a single bond,
Q is CF$_2$, OCF$_2$, CFH, OCFH or a single bond,
Y is F or Cl,
m is 1 or 2, and
n is 0 or 1.

Particularly preferred high Δε compounds of formula IX and X are selected from the following formulae

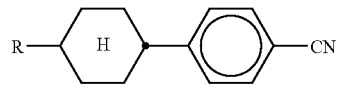
IXa

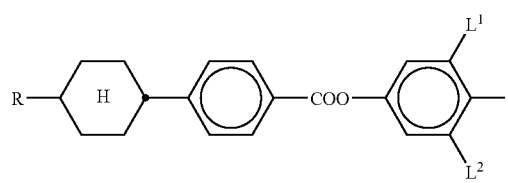
IXb

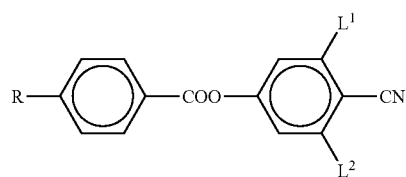
IXc

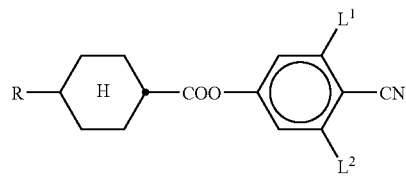
IXd

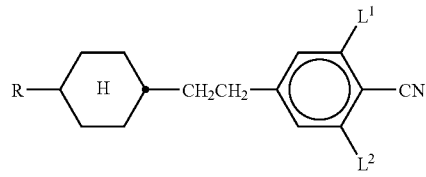
IXe

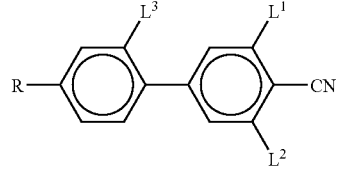
IXf

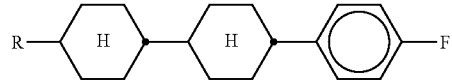
Xa

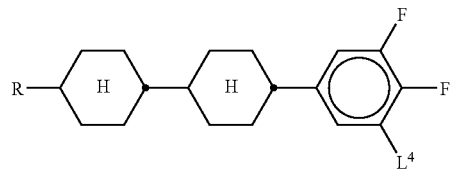
Xb

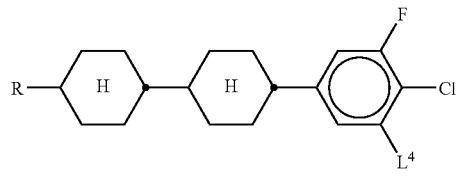
Xc

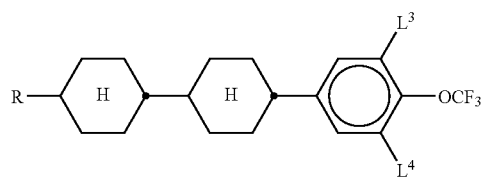
Xd

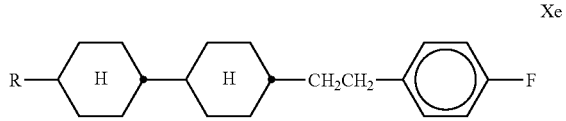
Xe

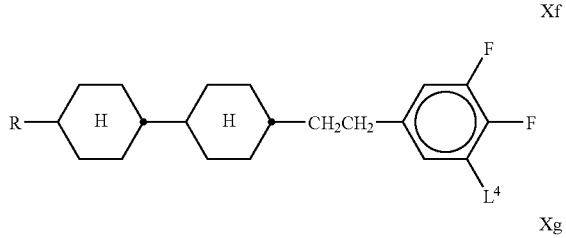
Xf

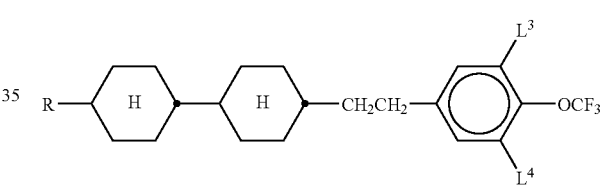
Xg

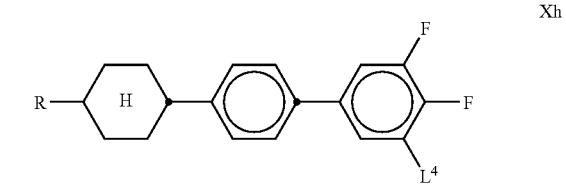
Xh

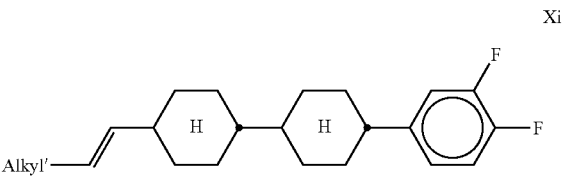
Xi

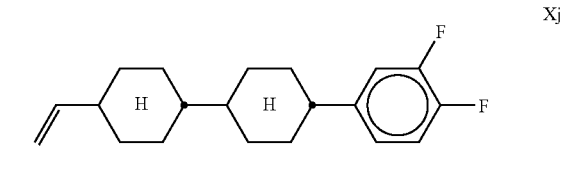
Xj wherein Alkyl is H or an alkyl group with 1 to 5 C atoms, R has one of the meanings of $R^4$ above and $L^1$, $L^2$, $L^3$ and $L^4$ have the above meanings.

Suitable high clearing point additives are e.g. mesogenic or liquid crystalline compounds comprising four six membered ring groups.

Particularly preferred high clearing point compounds are selected from the following formulae

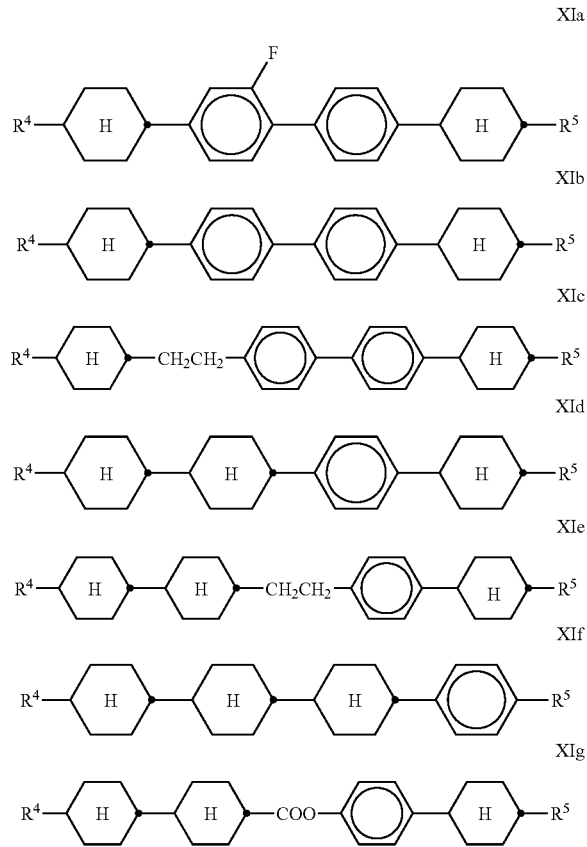

in which R⁵ has one of the meanings of R⁴ and the 1,4-phenylene groups in XIa to XIe may each, independently of one another, also be mono- or polysubstituted by fluorine.

Suitable low viscosity additives are e.g. mesogenic or liquid crystalline compounds selected from the class of cyclohexyl-cyclohexylenes with non-polar terminal groups.

Preferably the low viscosity compounds are selected from formula XII

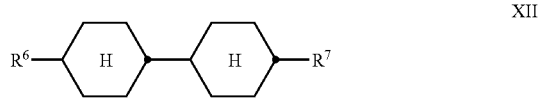

wherein R⁶ and R⁷ have one of the meanings of R⁴ in formula IX.

Particularly preferred are compounds of formula XII wherein R⁶ and/or R⁷ are alkenyl, preferably 1 E-alkenyl or 3 E-alkenyl with 2 to 7 C atoms.

The bimesogenic compounds of formula I and the liquid crystalline media comprising them can be used in liquid crystal displays, such as STN, TN, AMD-TN, temperature compensation, guest-host, phase change or surface stabilized or polymer stabilized cholesteric texture (SSCT, PSCT) displays, in particular in flexoelectric devices, in active and passive optical elements like polarizers, compensators, reflectors, alignment layers, colour filters or holographic elements, in adhesives, synthetic resins with anisotropic mechanical properties, cosmetics, diagnostics, liquid crystal pigments, for decorative and security applications, in nonlinear optics, optical information storage or as chiral dopants.

The compounds of formula I, and the mixtures obtainable thereof are particularly useful for flexoelectric liquid crystal display. Thus, another object of the present invention is a flexoelectric display comprising one or more compounds of formula I, or comprising a liquid crystal medium comprising at least one compound of formula I.

The inventive bimesogenic compounds of formula I and the mixtures thereof can be aligned in their cholesteric phase into different states of orientation by methods that are known to the expert, such as surface treatment or electric fields. For example, they can be aligned into the planar (Grandjean) state, into the focal conic state or into the homeotropic state. Inventive compounds of formula I comprising polar groups with a strong dipole moment can further be subjected to flexoelectric switching, and can thus be used in electrooptical switches or liquid crystal displays.

The switching between different states of orientation according to a preferred embodiment of the present invention is exemplarily described below in detail for a sample of an inventive compound of formula I.

According to this preferred embodiment, the sample is placed into a cell comprising two plane-parallel glass plates coated with electrode layers, e.g. ITO layers, and aligned in its cholesteric phase into a planar state wherein the axis of the cholesteric helix is oriented normal to the cell walls. This state is also known as Grandjean state, and the texture of the sample, which is observable e.g. in a polarization microscope, as Grandjean texture. Planar alignment can be achieved e.g. by surface treatment of the cell walls, for example by rubbing and/or coating with an alignment layer such as polyimide.

A Grandjean state with a high quality of alignment and only few defects can further be achieved by heating the sample to the isotropic phase, subsequently cooling to the chiral nematic phase at a temperature close to the chiral nematic-isotropic phase transition, and rubbing the cell.

In the planar state, the sample shows selective reflection of incident light, with the central wavelength of reflection depending on the helical pitch and the mean refractive index of the material.

When an electric field is applied to the electrodes, for example with a frequency from 10 Hz to 1 kHz, and an amplitude of up to 12 $V_{rms}$/μm, the sample is being switched into a homeotropic state where the helix is unwound and the molecules are oriented parallel to the field, i.e. normal to the plane of the electrodes. In the homeotropic state, the sample is transmissive when viewed in normal daylight, and appears black when being put between crossed polarizers.

Upon reduction or removal of the electric field in the homeotropic state, the sample adopts a focal conic texture, where the molecules exhibit a helically twisted structure with the helical axis being oriented perpendicular to the field, i.e. parallel to the plane of the electrodes. A focal conic state can also be achieved by applying only a weak electric field to a sample in its planar state. In the focal conic state the sample is scattering when viewed in normal daylight and appears bright between crossed polarizers.

A sample of an inventive compound in the different states of orientation exhibits different transmission of light. Therefore, the respective state of orientation, as well as its quality of alignment, can be controlled by measuring the light transmission of the sample depending on the strength of the applied electric field. Thereby it is also possible to determine the electric field strength required to achieve specific states of orientation and transitions between these different states.

In a sample of an inventive compound of formula I, the above described focal conic state consists of many disordered birefringent small domains. By applying an electric field greater than the field for nucleation of the focal conic texture, preferably with additional shearing of the cell, a uniformly aligned texture is achieved where the helical axis is parallel to the plane of the electrodes in large, well-aligned areas. In accordance with the literature on state of the art chiral nematic materials, such as P. Rudquist et al., Liq. Cryst. 23 (4), 503 (1997), this texture is also called uniformly-lying helix (ULH) texture. This texture is required to characterize the flexoelectric properties of the inventive compound.

The sequence of textures typically observed in a sample of an inventive compound of formula I on a rubbed polyimide substrate upon increasing or decreasing electric field is given below:

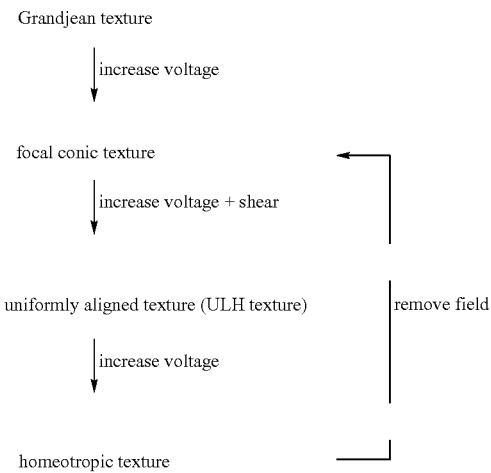

Starting from the ULH texture, the inventive flexoelectric compounds and mixtures can be subjected to flexoelectric switching by application of an electric field. This causes rotation of the optic axis of the material in the plane of the cell substrates, as shown in FIG. 1, which leads to a change in transmission when placing the material between crossed polarizers. The flexoelectric switching of inventive materials is further described in detail in the introduction above and in the examples.

It is also possible to obtain the ULH texture, starting from the focal conic texture, by applying an electric field with a high frequency, of for example 10 kHz, to the sample whilst cooling slowly from the isotropic phase into the cholesteric phase and shearing the cell. The field frequency may differ for different compounds.

The bimesogenic compounds of formula I are particularly useful in flexoelectric liquid crystal displays as they can easily be aligned into macroscopically uniform orientation, and lead to high values of the elastic constant $k_{11}$ and a high flexoelectric coefficient e in the liquid crystal medium.

The liquid crystal medium preferably exhibits a $K_{11} > 1 \times 10^{-10}$ N and a flexoelectric coefficient $e > 1 \times 10^{-10}$ C/m.

A further aspect of the present invention relates to improvements in flexoelectric devices. In particular, the inventors have found that by using a display cell wherein the cell walls exhibit hybrid alignment conditions, a flexoelectric display device with improved electrooptical performance can be realized.

Thus, a flexoelectric display according to a preferred embodiment of the present invention comprises two plane parallel substrates, preferably glass plates covered with a transparent conductive layer such as indium tin oxide (ITO) on their inner surfaces, and a flexoelectric liquid crystalline medium provided between the substrates, characterized in that one of the inner substrate surfaces exhibits homeotropic alignment conditions and the opposite inner substrate surface exhibits planar alignment conditions for the liquid crystalline medium.

Planar alignment can be achieved e.g. by means of an alignment layer, for example a layer of rubbed polyimide or sputtered $SiO_x$, that is applied on top of the substrate.

Alternatively it is possible to directly rub the substrate, i.e. without applying an additional alignment layer. For example rubbing can be achieved by means of a rubbing cloth, such as a velvet cloth, or with a flat bar coated with a rubbing cloth. In a preferred embodiment of the present invention rubbing is achieved by means of a at least one rubbing roller, like e.g. a fast spinning roller that is brushing across the substrate, or by putting the substrate between at least two rollers, wherein in each case at least one of the rollers is optionally covered with a rubbing cloth. In another preferred embodiment of the present invention rubbing is achieved by wrapping the substrate at least partially at a defined angle around a roller that is preferably coated with a rubbing cloth.

Homeotropic alignment can be achieved e.g. by means of an alignment layer coated on top of the substrate. Suitable aligning agents used on glass substrates are for example alkyltrichlorosilane or lecithine, whereas for a plastic substrate thin layers of lecithine, silica or high tilt polyimide orientation films as aligning agents may be used. In a preferred embodiment of the invention a silica coated plastic film is used as a substrate.

Further suitable methods to achieve planar or homeotropic alignment are described for example in J. Cognard, Mol. Cryst. Liq. Cryst. 78, Supplement 1, 1-77 (1981).

By using a display cell with hybrid alignment conditions, a very high switching angle of flexoelectric switching, fast response times and a good contrast can be achieved.

The flexoelectric display according to present invention may also comprise plastic substrates instead of glass substrates. Plastic film substrates are particularly suitable for rubbing treatment by rubbing rollers as described above.

Without further elaboration, it is believed that one skilled in the art can, using the preceding description, utilize the present invention to its fullest extent. The following examples are, therefore, to be construed as merely illustrative and not limitative of the remainder of the disclosure in any way whatsoever.

In the foregoing and in the following examples, unless otherwise indicated, all temperatures are set forth uncorrected in degrees Celsius and all parts and percentages are by weight.

The following abbreviations are used to illustrate the liquid crystalline phase behaviour of the compounds: K=crystalline; N=nematic; S=smectic; Ch=cholesteric; I=isotropic. The numbers between the symbols indicate the phase transition temperatures in ° C.

Especially preferred compounds of formula I are those symmetrical compounds in which the spacer group is linked by O-atoms to the mesogenic moieties, preferably those of the sub-formulae Ia to Ie

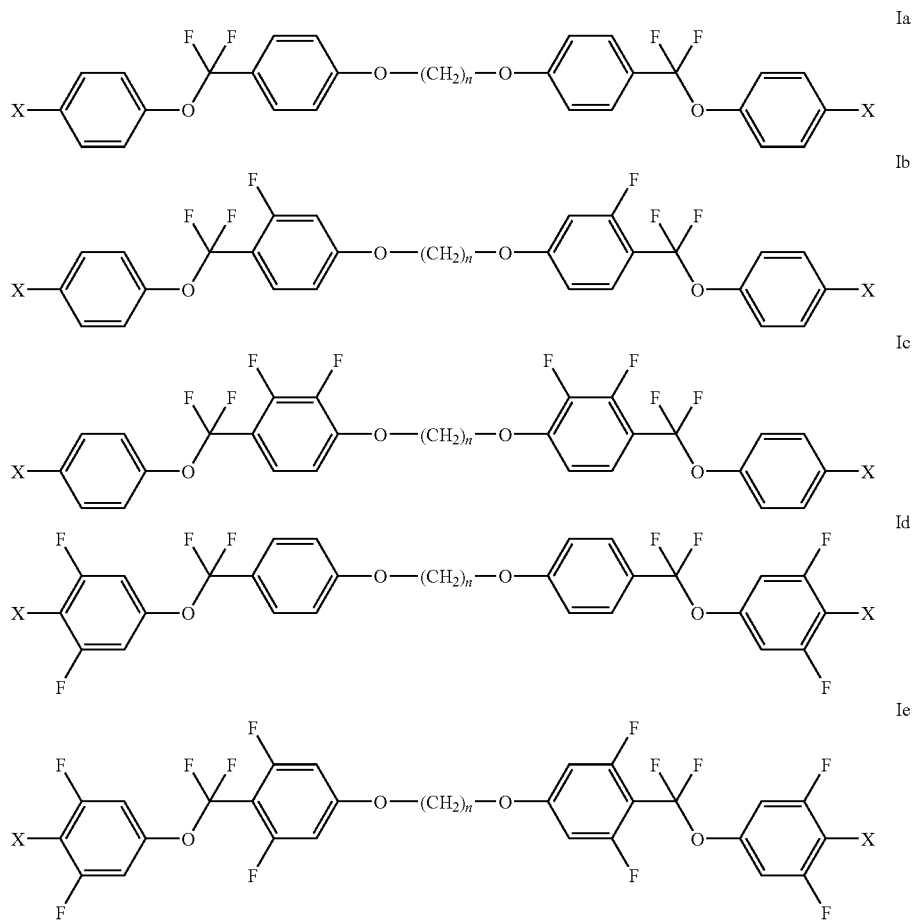
wherein
X is F, CN or OCF$_3$ and
n is an integer, preferably in the range from 4 to 25, preferably from 5 to 20.
Another especially preferred group of compounds of formula I are those symmetrical compounds in which the spacer group is linked by single bonds to the mesogenic moieties, preferably those of the sub-formulae If to Ij
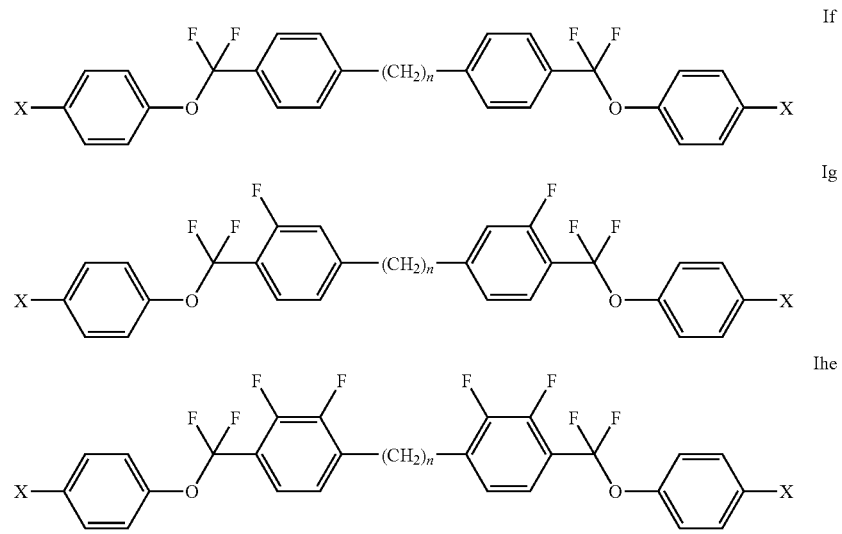

-continued

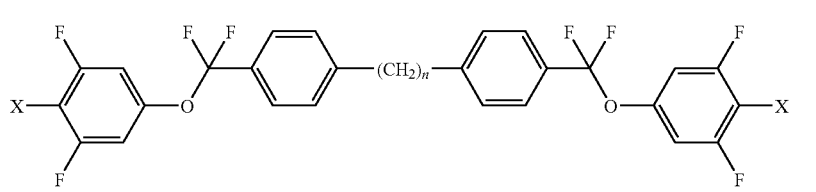

Il

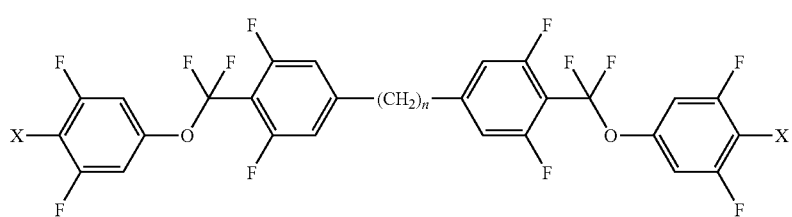

Ij wherein

X is F, CN or OCF$_3$ and n is an integer, preferably in the range from 4 to 25, preferably from 5 to 20.

Preferred non-symmetrical compounds of formula I are those of the following formulae, sub-formulae I'a to I'f wherein X is F, CN or OCF$_3$, n is an integer, preferably in the range from 4 to 25, preferably from 5 to 20, and R" is alkyl.

A further preferred group of compounds of formula I are those of the following formulae, sub-formulae I"a to I"c

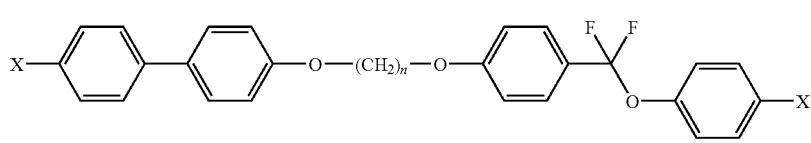

I'a

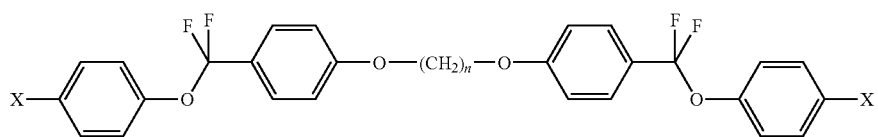

I'b

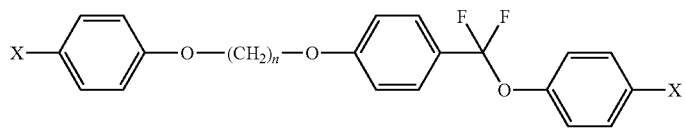

I'c

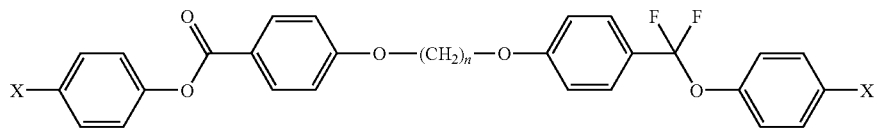

I'd

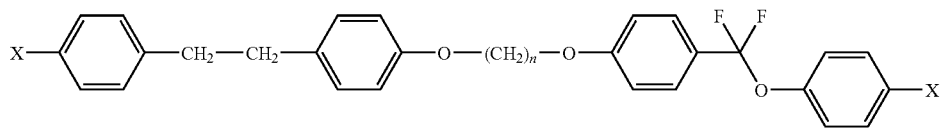

I'e

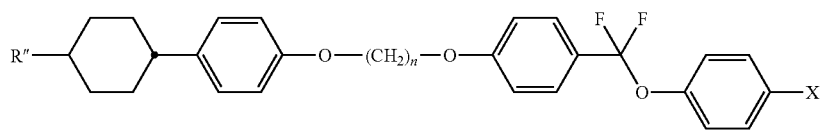

I'f

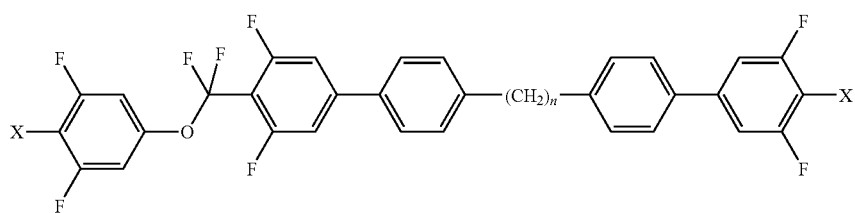

I″a

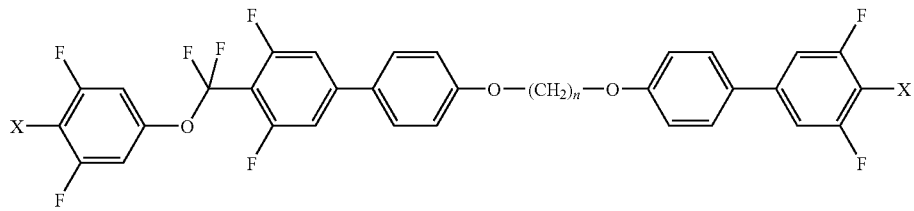

I″b

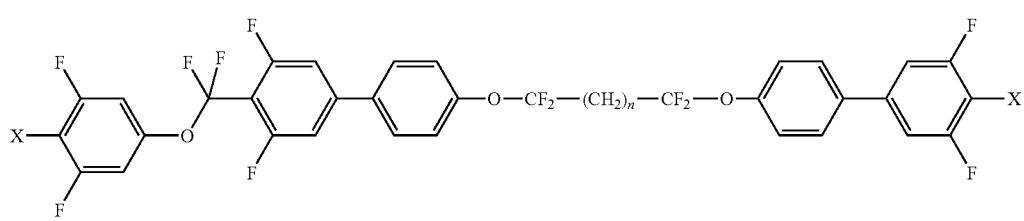

I″c wherein
X is F, CN or OCF$_3$, preferably, F,
n is an integer, preferably in the range from 4 to 25, preferably from 5 to 20, and in formulae I″a and I″b preferably 8 and in formula I″c preferably 6.

Also preferred compounds of formula I are those of the sub-formula I″d

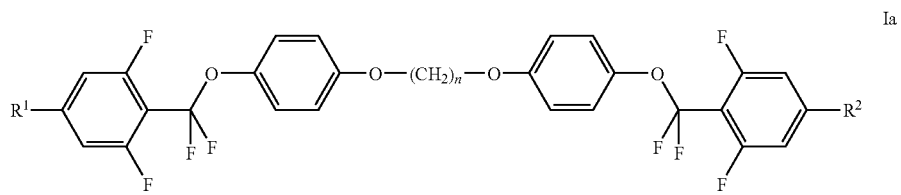

Ia wherein
R$^1$ and R$^2$ have the respective meanings given under formula I, preferably are each independently alkyl or alkoxy, more preferably alkyl and most preferably n-propyl and
n is an integer, preferably in the range from 4 to 25 preferably from 5 to 20 and most preferably 8.

The compounds of formula I according to the present invention are prepared according to the following four reaction schemes (I to IV), wherein the parameters have the respective meanings given above.

Schemes

Scheme I

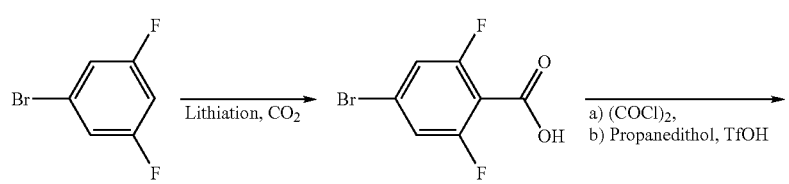

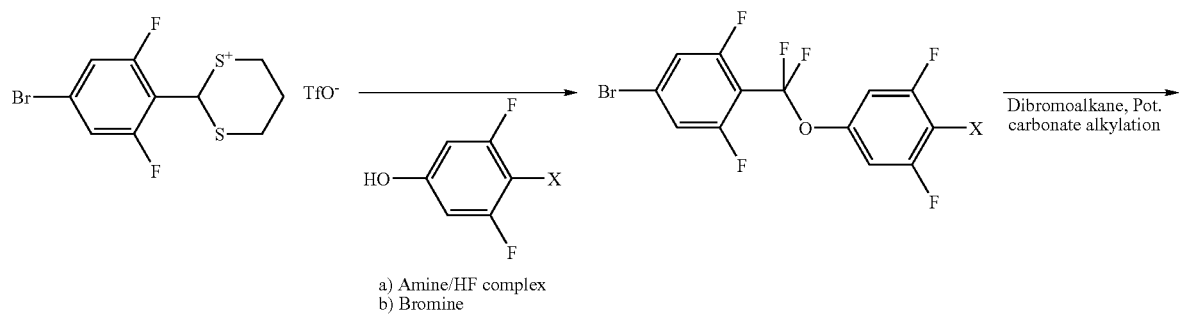
a) Amine/HF complex
b) Bromine
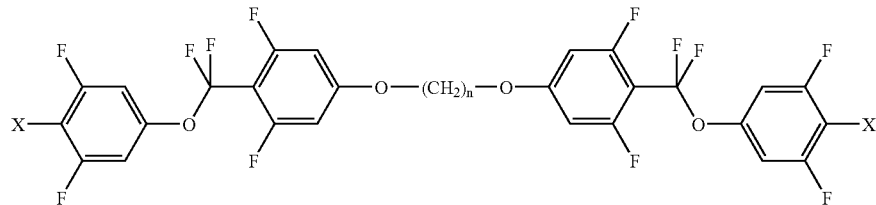
Scheme II
I.
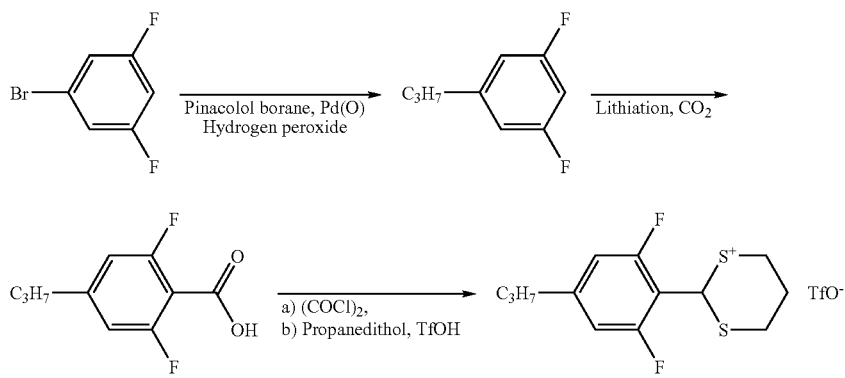
II.
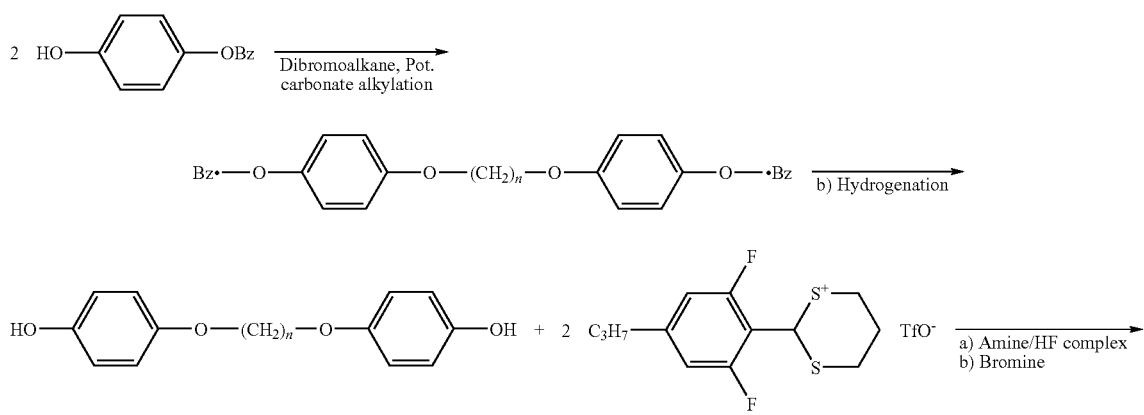
a) Amine/HF complex
b) Bromine -continued
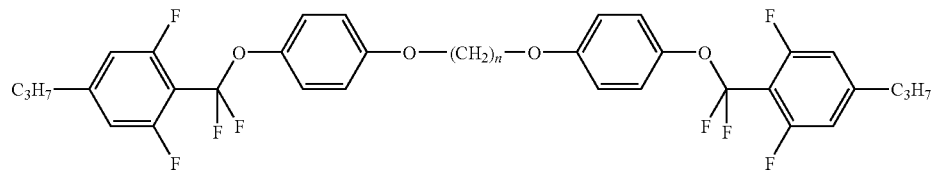
Scheme III
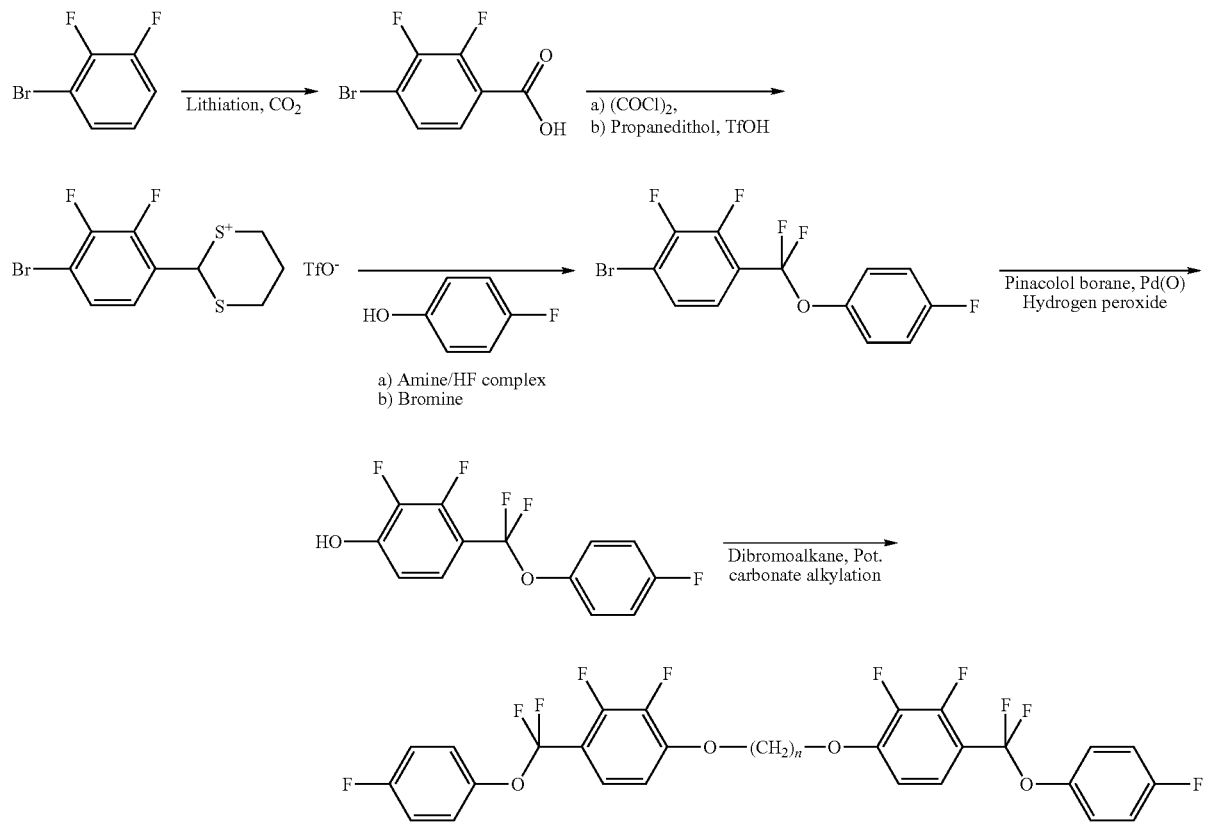
Scheme IV
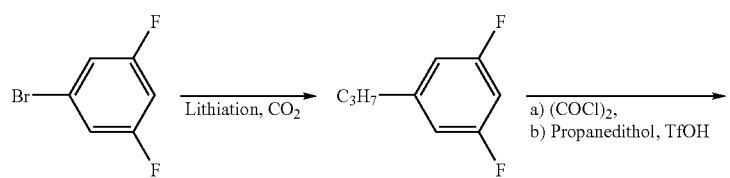

-continued
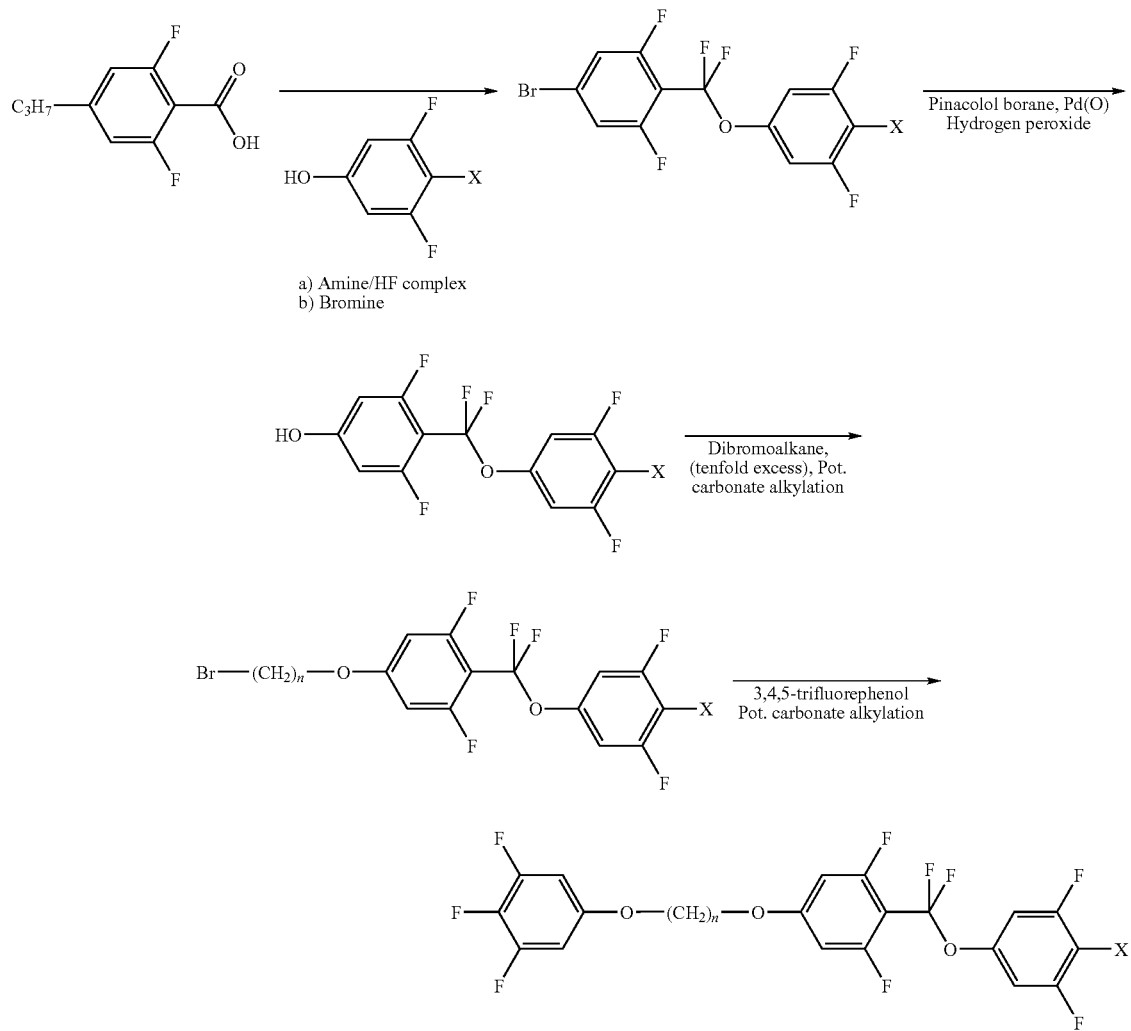
a) Amine/HF complex
b) Bromine
EXAMPLES
The following examples are intended to illustrate the present invention without limiting it in any way. They however show the range of structures and respective properties which can be achieved according to the present invention.
Example 1
The compound of formula (1) is prepared as described below.
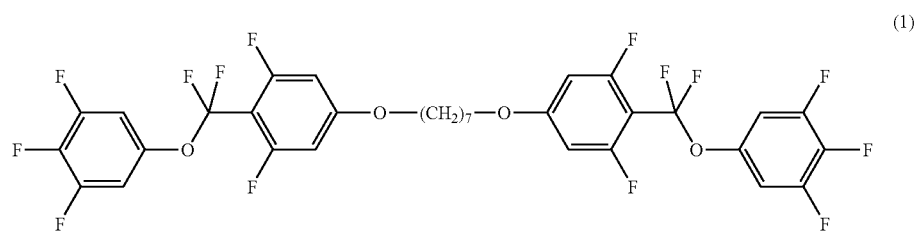
(1)

Step 1.1: Preparation of 4-bromo-3,5-difluorobenzoic acid

To a solution of 3,5-difluorobromobenzene in THF (0.5 mole [1M]), which is kept at a temperature of −70° C., n-buthyl lithium (0.55 mole [1.6M]) are added dropwise. After stirring for 10 minutes at −70° C. a stream of $CO_2$ gas is bubbled through the mixture at a rate sufficiently small to keep the temperature between −60° C. and −70° C. After conventional workup and purification by base extraction followed by recrystallisation from toluene, 4-bromo-3,5-difluorophenylbenzoic acid is isolated.

Compare Schlosser et al. Tett. Lett. 1996, 37, 36, 6551.

Step 1.2: Preparation of 4-bromo-3,5-difluorophenyl thianylium triflate

To a slurry of 3,5-difluorobrombenzoic acid in DMC (0.4 mole), which is kept at a temperature of 0° C., 5 drops of DMF are added followed by dropwise addition of oxaalkyl chloride (0.5 mole) at a rate sufficiently small to maintain the temperature of the mixture between 0° C. and 5° C. After stirring the reaction mixture for 2 hours it is filtered and the solvent removed under reduced pressure to give 4-bromo-3,5-difluorophenylbenzoylchloride.

Propanediol (0.3 mole) is cooled under a nitrogen atmosphere to a temperature of 0° C. Then 4-bromo-3,5-difluorophenylbenzoylchloride (0.3 mole) are swiftly added with continuous stirring. The reaction mixture is then cooled to −10° C. and triflic acid (0.45 mole) is added. The reaction mixture is stirred further for 1 hour, then acetic anhydride (2 mole) is added maintaining the temperature below 5° C. After adding diethyl ether and stirring for 1 more hour at −10° C., 4-bromo-3,5-difluorophenyl-thianylium triflate is filtered off and washed with cold ether.

Step 1.3: Preparation of 1-(4-bromo-3,5-difluorophenyl)-1,1-difluoro-(3,4,5-trifluorophenyl)methyl ether 4-bromo-3,5-difluorophenyl-thianylium triflate (0.2 mole [1M]) is dissolved in DCM at −70° C. To this mixture a solution of triethylamine (0.3 mole [1M]) and 3,4,5-trifluorophenol (0.3 mole [1M]) in DCM is added dropwise maintaining the temperature at −70° C. The temperature is kept at −70° C. and the reaction mixture stirred further for 1 hour. Then triethylamine hydrofluoride (1 mole) is added dropwise and the reaction mixture stirred for 30 minutes followed by dropwise addition of a solution of bromine (1 mole [1M]) in DCM, all at a temperature of −70° C.

After careful neutralisation with NaOH (aq.), extraction and purification by chromatography over silica, eluting with heptane and recrystallisation from pentane, 1-(4-bromo-3,5-difluorophenyl)-1,1-difluoro-(3,4,5-trifluorophenyl)methyl ether is obtained as a colourless solid.

Step 1.4: Preparation of 1-(4-hydroxy-3,5-difluorophenyl)-1,1-difluoro-(3,4,5-trifluorophenyl)methyl ether 1-(4-bromo-3,5-difluorophenyl)-1,1-difluoro-(3,4,5-trifluorophenyl)-methyl Ether (0.1 mole), dioxane (100 ml), $PdCl_2(dppf)$ (0.003 mole), triethylamine (0.3 mole) and pinacol borane (0.15 mole) are combined under an inert gas atmosphere and heated (under reflux) at 80° C. for 6 hours. After extraction and conventional workup, the pinacol boronate ester is isolated as a white semi-solid.

The pinacol boronate ester is dissolved in THF and hydrogen peroxide (0.3 mole [60 vol.]) is added dropwise under stirring. The reaction mixture is then stirred for 24 hours at ambient temperature, then neutralised with ammonium ferrous sulphate solution. After conventional workup, filtration through silica and recrystallisation from toluene, 1-(4-hydroxy-3,5-difluorophenyl)-1,1-difluoro-(3,4,5-trifluorophenyl)methyl ether is obtained as a colourless solid.

Compare Murata et al., J. Org. Chem. 1997, 62, 6458.

Step 1.5: Preparation of compound (1)

1-(4-hydroxy-3,5-difluorophenyl)-1,1-difluoro-(3,4,5-trifluorophenyl)-methyl Ether (0.2 mole), butanone (200 ml), potassium carbonate (100 g) and 1,9-dibromoheptane (0.95 mole) are heated together under reflux for 18 hours. Then the reaction mixture is filtered and the solvent removed under reduced pressure to yield a crude product. This material is purified by chromatography over silica, eluting with heptane and ethyl acetate followed by recrystallisation from hexane to yield the colourless solid product.

Example 2

The compound of formula (2) is prepared analogously to example 1.

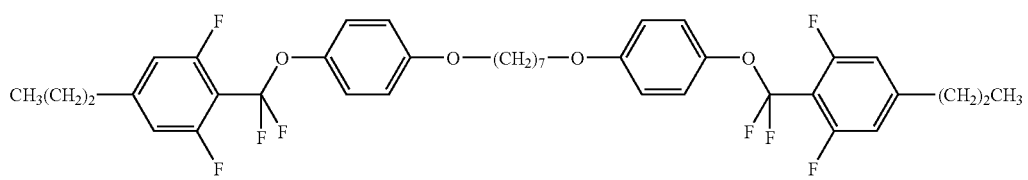

(2)

Example 3

The compound of formula (3) is prepared analogously to example 1.

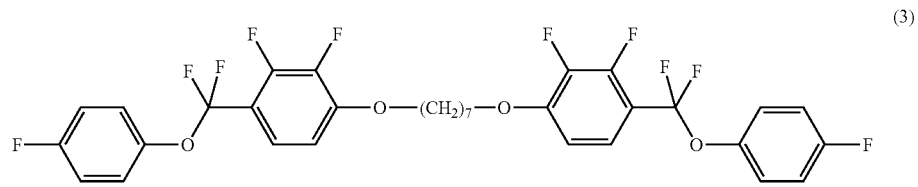

(3)

Example 4

The compound of formula (4) is prepared analogously to example 1.

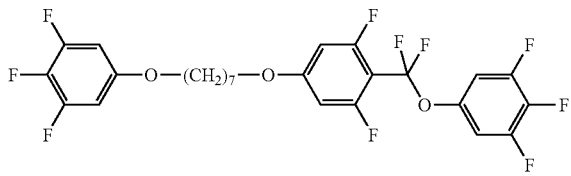
(4)

Example 5

The compound of formula (5)

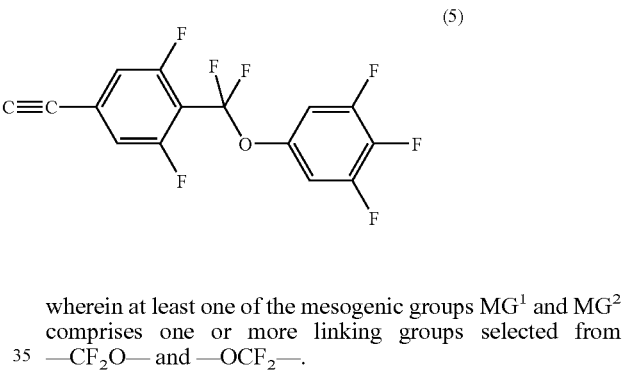
(5)

is prepared analogously to the compound of example 1.

The phase sequence of this substance (5) is C 48° C. I.

USE EXAMPLES

Use Example 1

10% of the compound of example 1 is dissolved in the nematic liquid crystal host mixture ZLI-4792, available from Merck KGaA. The resulting mixture is investigated for its physical properties. Then the change in the properties upon addition of the compound are extrapolated to a concentration of 100% of the compound. The extrapolated values of the birefringence ($\Delta n$) and of the dielectric anisotropy ($\Delta \epsilon$) of the compound are 0.118 and +5.4, respectively.

Use Example 2

Like in use example 1, 10% of the compound of interest, now however, that of example 5, are dissolved in the nematic liquid crystal host mixture ZLI-4792. The resulting mixture is investigated for its physical properties. Then the change in the properties upon addition of the compound are extrapolated to a concentration of 100% of the compound. The extrapolated values are $\Delta n=0.0636$ and $\Delta \epsilon=+14.0$, respectively.

The invention claimed is:

1. A bimesogenic compound of formula I $$R^1\text{-}MG^1\text{-}X^1\text{-}Sp\text{-}X^2\text{-}MG^2\text{-}R^2 \qquad \text{I}$$

wherein
$R^1$ and $R^2$ are each independently F, Cl, CN, NCS or a straight-chain or branched alkyl group with 1 to 25 C atoms which may be unsubstituted, mono- or polysubstituted by halogen or CN, it being also possible for one or more non-adjacent CH$_2$ groups to be replaced, in each case independently from one another, by —O—, —S—, —NH—, —N(CH$_3$)—, —CO—, —COO—, —OCO—, —O—CO—O—, —S—CO—, —CO—S—, —CH=CH—, —CH=CF—, —CF=CF— or —C≡C— in such a manner that oxygen atoms are not linked directly to one another, $MG^1$ and $MG^2$ are each independently a mesogenic group, Sp is a spacer group comprising 4 to 40 C atoms, wherein one or more non-adjacent CH$_2$ groups may also be replaced by —O—, —S—, —NH—, —N(CH$_3$)—, —CO—, —O—CO—, —S—CO—, —O—COO—, —CO—S—, —CO—O—, —CH(halogen)-, —CH(CN)—, —CH=CH— or —C≡C—, and $X^1$ and $X^2$ are each independently —O—, —S—, —CO—, —COO—, —OCO—, —O—CO—O—, —CO—NH—, —NH—CO—, —CH$_2$CH$_2$—, —OCH$_2$—, —CH$_2$O—, —SCH$_2$—, —CH$_2$S—, —CH=CH—, —CH=CH—COO—, —OCO—CH=CH—, —C≡C— or a single bond, wherein at least one of the mesogenic groups $MG^1$ and $MG^2$ comprises one or more linking groups selected from —CF$_2$O— and —OCF$_2$—.

2. A bimesogenic compound according to claim 1, wherein $MG^1$ and $MG^2$ are of formula II $$\text{-}A^1\text{-}(Z^1\text{-}A^2)_m\text{-} \qquad \text{II}$$

wherein
in at least in one of $MG^1$ and $MG^2$ at least one of
$Z^1$ is —CF$_2$O— or —OCF$_2$—, and the other
$Z^1$ are, in each case independently, —COO—, —OCO—, —O—CO—O—, —OCH$_2$—, —CH$_2$O—, —CH$_2$CH$_2$—, —(CH$_2$)$_4$—, —CF$_2$CF$_2$—, —CH$_2$CF$_2$—, —CF$_2$CH$_2$—, —CH=CH—, —CF=CF—, —CH=CH—COO—, —OCO—CH=CH—, —C≡C —, —CF$_2$O—, —OCF$_2$— or a single bond, $A^1$ and $A^2$ are each independently 1,4-phenylene, wherein in addition one or more CH groups may be replaced by N, trans-1,4-cyclohexylene in which, in addition, one or two non-adjacent CH$_2$ groups may be replaced by O and/or S, 1,4-cyclohexenylene, 1,4-bicyclo-(2,2,2)-octylene, piperidine- 1,4-diyl, naphthalene-2,6-diyl, decahydro-naphthalene-2,6-diyl, 1,2,3,4-tetrahydro-naphthalene-2,6-diyl, cyclobutane-1,3-diyl, spiro[3.3]heptane-2,6-diyl or dispiro[3.1.3.1] decane-2,8-diyl, it being possible for all these groups to be unsubstituted, mono-, di-, tri- or tetrasubstituted with F, Cl, CN or alkyl, alkoxy, alkylcarbonyl or alkoxycarbonyl groups with 1 to 7 C atoms, wherein one or more H atoms may be substituted by F or Cl, and m is 0, 1, 2 or 3, wherein at least one of the mesogenic groups $MG^1$ and $MG^2$ comprises one or more linking groups selected from —CF$_2$O— and —OCF$_2$—, whereby at least one m group in $MG^1$ and $MG^2$ is not 0.

3. A bimesogenic compound according to claim 1, wherein one of $MG^1$ and $MG^2$ is or both of them are independently, a group of the following formulae or a mirror image thereof

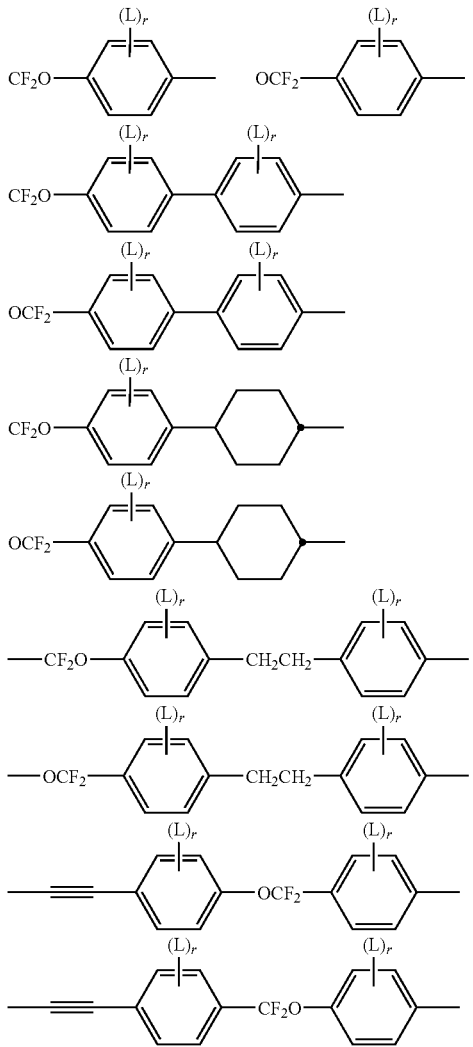

wherein
L is F, Cl, CN, OH, $NO_2$ or an optionally fluorinated alkyl, alkoxy or alkanoyl group with 1 to 7 C atoms, and
r in each occurrence independently is 0, 1 or 2,
wherein at least one of the mesogenic groups $MG^1$ and $MG^2$ comprises one or more linking groups selected from —$CF_2O$— and —$OCF_2$—.

4. A bimesogenic compound according to claim 1, wherein $R^1$ and $R^2$ are F, Cl, CN, $NO_2$, $OCH_3$, $COCH_3$, $COC_2H_5$, $COOCH_3$, $COOC_2H_5$, $CF_3$, $C_2F_5$, $OCF_3$, $OCHF_2$, or $OC_2F_5$,
wherein at least one of the mesogenic groups $MG^1$ and $MG^2$ comprises one or more linking groups selected from —$CF_2O$— and —$OCF_2$—.

5. A bimesogenic compound according to claim 1, wherein Sp is —$(CH_2)_o$— and o is an integer from 5 to 15,
wherein at least one of the mesogenic groups $MG^1$ and $MG^2$ comprises one or more linking groups selected from —$CF_2O$— and —$OCF_2$—.

6. A liquid crystal device comprising a compound of claim 1.

7. Liquid crystalline medium comprising at least two components, at least one of which is a bimesogenic compound according to claim 1.

8. Liquid crystal device with a liquid crystalline medium comprising at least two components, at least one of which is a bimesogenic compound according to claim 1.

9. Liquid crystal device according to claim 8, which is a flexoelectric device.

10. Liquid crystal device according to claim 8, which comprises two plane parallel electrodes the inner surfaces of which exhibit hybrid alignment conditions.

11. A bimesogenic compound according to claim 1, wherein $R^1$-$MG^1$-$X^1$- and $R^2$-$MG^2$-$X^2$- are identical,
whereby both mesogenic groups $MG^1$ and $MG^2$ comprise one or more linking groups selected from —$CF_2O$— and —$OCF_2$—.

12. A bimesogenic compound according to claim 1, wherein $R^1$-$MG^1$-$X^1$- and $R^2$-$MG^2$-$X^2$- are different,
wherein at least one of the mesogenic groups $MG^1$ and $MG^2$ comprises one or more linking groups selected from —$CF_2O$— and —$OCF_2$—.

13. A bimesogenic compound according to claim 1, wherein
$R^1$ and $R^2$ are each independently F, Cl, CN, NCS or a straight-chain or branched alkyl group with 2 to 25 C atoms which may be unsubstituted, mono- or polysubstituted by halogen or CN, it being also possible for one or more non-adjacent $CH_2$ groups to be replaced, in each case independently from one another, by —O—, —S—, —NH—, —N($CH_3$)—, —CO—, —COO—, —OCO—, —O—CO—O—, —S—CO—, —CO—S—, —CH═CH—, —CH═CF—, —CF═CF— or —C≡C— in such a manner that oxygen atoms are not linked directly to one another,
wherein at least one of the mesogenic groups $MG^1$ and $MG^2$ comprises one or more linking groups selected from —$CF_2O$— and —$OCF_2$—.

14. A bimesogenic compound according to claim 1, wherein
$R^1$ and $R^2$ are each independently F, Cl, CN, NCS or a straight-chain or branched alkyl group with 3 to 25 C atoms which may be unsubstituted, mono- or polysubstituted by halogen or CN, it being also possible for one or more non-adjacent $CH_2$ groups to be replaced, in each case independently from one another, by —O—, —S—, —NH—, —N($CH_3$)—, —CO—, —COO—, —OCO—, —O—CO—O—, —S—CO—, —CO—S—, —CH═CH—, —CH═CF—, —CF═CF — or —C≡C— in such a manner that oxygen atoms are not linked directly to one another,
wherein at least one of the mesogenic groups $MG^1$ and $MG^2$ comprises one or more linking groups selected from —$CF_2O$— and —$OCF_2$—.

15. A bimesogenic compound according to claim 1, wherein
Sp is a linear or branched alkylene group having 5 to 40 C atoms, in which one or more non-adjacent $CH_2$ groups may be replaced by —O—, —S—, —NH—, —N($CH_3$)—, —CO—, —O—CO—, —S—CO—, —O—COO—, —CO—S—, —CO—O—, —CH(halogen)-, —CH(CN)—, —CH═CH — or —C≡C —,
wherein at least one of the mesogenic groups $MG^1$ and $MG^2$ comprises one or more linking groups selected from —$CF_2O$— and —$OCF_2$—.

16. A bimesogenic compound according to claim 1, wherein
Sp is a spacer group comprising 4 to 40 C atoms, including at least one $CH_2$ group, wherein one or more non-adjacent $CH_2$ groups may also be replaced by —O —, —S —, —NH—, —N($CH_3$)—, —CO—, —O—CO—, —S—CO—, —O—COO—, —CO—S—, —CO—O—, —CH(halogen)-, —CH(CN)—, —CH═CH— or —C≡C—,
wherein at least one of the mesogenic groups MG$^1$ and MG$^2$ comprises one or more linking groups selected from —CF$_2$O— and —OCF$_2$—.

17. A bimesogenic compound according to claim 2, wherein
Sp is a linear or branched alkylene group having 5 to 40 C atoms, in which one or more non-adjacent CH$_2$ groups may be replaced by —O—, —S—, —NH—, —N(CH$_3$)—, —CO—, —O—CO—, —S—CO—, —O—COO—, —CO—S—, —CO—O—, —CH(halogen)-, —CH(CN)—, —CH═CH— or —C≡C—,
wherein at least one of the mesogenic groups MG$^1$ and MG$^2$ comprises one or more linking groups selected from —CF$_2$O— and —OCF$_2$—.

18. A bimesogenic compound according to claim 2, wherein
Sp is a spacer group comprising 4 to 40 C atoms, including at least one CH$_2$ group, wherein one or more non-adjacent CH$_2$ groups may also be replaced by —O—, —S—, —NH—, —N(CH$_3$)—, —CO—, —O—CO—, —S—CO—, —O—COO—, —CO—S—, —CO—O—, —CH(halogen)-, —CH(CN)—, —CH═CH— or —C≡C—,
wherein at least one of the mesogenic groups MG$^1$ and MG$^2$ comprises one or more linking groups selected from —CF$_2$O— and —OCF$_2$—.

19. A flexoelectric device comprising a bimesogenic compound according to claim 17.

20. A flexoelectric device comprising a bimesogenic compound according to claim 18.

\* \* \* \* \*